United States Patent

[11] 3,550,706

| [72] | Inventor | Lucius D. Watkins<br>Hartland, Wis. |
|---|---|---|
| [21] | Appl. No. | 701,604 |
| [22] | Filed | Jan. 30, 1968 |
| [45] | Patented | Dec. 29, 1970 |
| [73] | Assignee | Outboard Marine Corporation<br>Waukegan, Ill.<br>a corporation of Delaware |

[54] STEERING ACTUATED BANKING MECHANISM FOR SNOW VEHICLE
6 Claims, 5 Drawing Figs.

[52] U.S. Cl.............................................. 180/5,
280/21
[51] Int. Cl. ............................................. B62m 27/02
[50] Field of Search.................................... 180/5, 5A,
3, 46; 280/16, 21

[56] References Cited
UNITED STATES PATENTS
3,390,894 7/1968 Olsen ......................... 280/43.17

1,893,381 1/1933 Walker........................ 280/21
FOREIGN PATENTS
238,312 9/1911 Germany..................... 280/21.2
986,197 7/1951 France ........................ 280/21.1

*Primary Examiner*—Richard J. Johnson
*Attorneys*—Wheeler, Wheeler, House & Clemency and Robert K. Gerling ABSTRACT: Disclosed herein is a steering actuated banking mechanism for a snow vehicle. The skis or runners utilized to support the frame of a snow vehicle are connected to columns which are movable axially in sleeves secured to the snow vehicle frame. Circumferentially and axially extending slots or cam tracks in the sleeves cooperate with rollers or cam followers mounted on the columns to move the columns axially relative to the sleeves upon rotation of the columns, during a turn, by a steering assembly. Actuation of the steering assembly to negotiate a turn causes extension of one runner from the frame and retraction of the other runner, thus banking the vehicle.

PATENTED DEC 29 1970
3,550,706
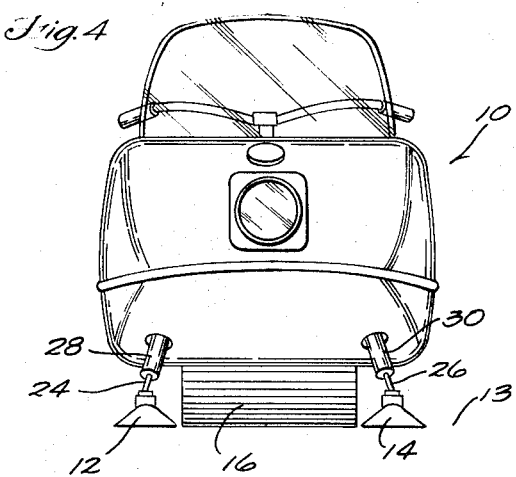
Fig. 4
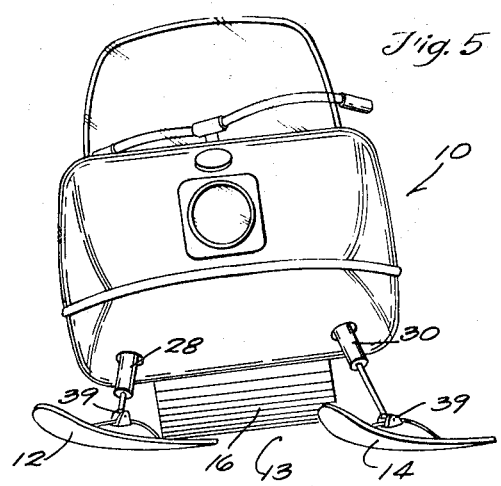
Fig. 5
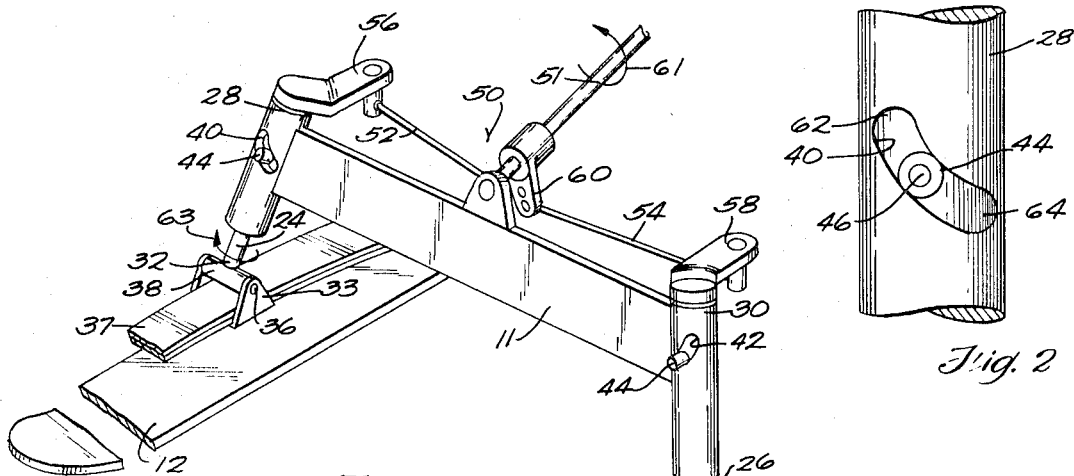
Fig. 1
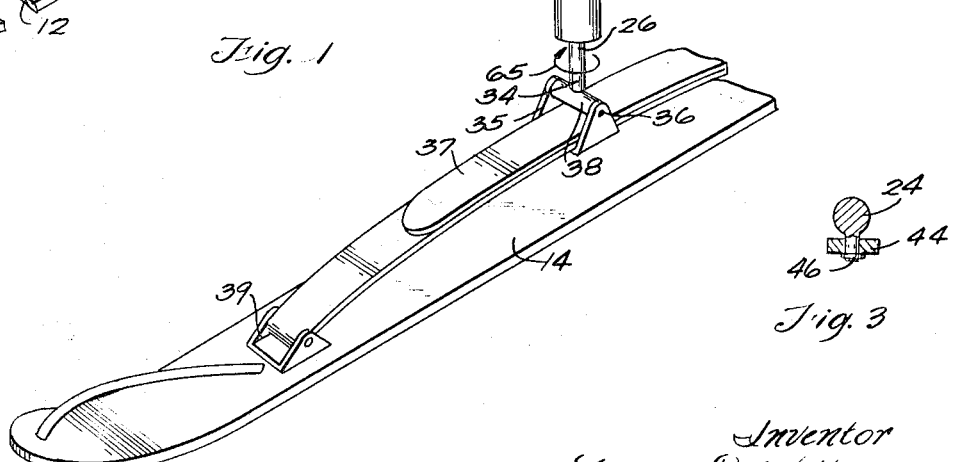
Fig. 2
Fig. 3
Inventor
Lucius D. Watkins
By
Wheeler, Wheeler, House & Clemency
Attorneys

STEERING ACTUATED BANKING MECHANISM FOR SNOW VEHICLE

BACKGROUND OF INVENTION

In operation of snow vehicles, it is desirable to bank the vehicle during a turn to move the center of gravity of the vehicle inwardly toward the center of the turning circle to increase stability. It is also desirable to tilt or bank the vehicle so that the plane of the bottom of the runners is at an angle to the direction of thrust of the runners to minimize slippage of the runners on the surface.

SUMMARY OF INVENTION

The invention provides a steering actuated banking mechanism which tilts the snow vehicle during a turn to increase stability and minimize side slipping of the runners and slicing of the snow laterally by the endless track utilized to propel the vehicle.

One of the principal objects of the invention is the provision of a snow vehicle having means connecting a pair of runners to a frame and to a steering assembly and operable responsive to steering actuation of the steering assembly for turning the runners about respective axes and for changing the vertical distance of the runners from the frame in opposite directions relative to the frame during turning of the runners about the steering axes in response to steering actuation of the steering assembly.

In this regard, the right and left skis or runners utilized to support the forward end of the snow vehicle are connected to columns, and each column is rotatably supported in a vertical sleeve secured to the snow vehicle frame. Circumferentially and axially extending slots in the sleeve walls provide cam tracks or surfaces which cooperate with cam followers on the steering columns. The cam followers are in the form of rollers which are rotatably supported on pegs extending perpendicularly from the columns.

Rotation of the ski columns by actuation of the steering linkage or assembly causes movement of the cam followers in the cam slots. When the snow vehicle is proceeding on a straight course, the cam followers are centered in the slots, with a portion of the slots extending upwardly and downwardly of the cam followers. When negotiating a right turn, the cam follower in the right sleeve travels upwardly in the cam slot to decrease the distance between the runner and the frame, and the cam follower in the left sleeve travels downwardly from the center position to increase the distance of the left runner from the frame, thus banking the vehicle.

With the invention, the increased stability afforded to a vehicle during a turn permits negotiation of tighter turns with a minimum of side slippage than heretofore possible.

Further objects and advantages of the invention will become apparent from the following description and accompanying drawings.

DRAWINGS

FIG. 1 is a fragmentary perspective view of a steering and banking mechanism for a snow vehicle in accordance with the invention.

FIG. 2 is a fragmentary enlarged view of the cam follower and cam slot shown in FIG. 1.

FIG. 3 is a sectional view of the cam follower of FIG. 2.

FIG. 4 is a front view of a snow vehicle embodying the invention.

FIG. 5 is a front view of the snow vehicle embodying the invention with the runners turned.

DETAILED DESCRIPTION

In the drawings, FIG. 4 discloses a snow vehicle which is generally designated 10, and which includes a frame 11 and right and left skis or runners respectively 12 and 14 for supporting the forward end of the snow vehicle 10 above a surface 13. The snow vehicle is propelled by an endless track 16 driven by an engine (not shown).

In operation of a conventional snow vehicle, and in particular during a turn, when the planes of the bottoms of the runners or skis are parallel to the surface to be traveled, little resistance is afforded to the thrust component acting parallel to the surface. Accordingly, slippage of the runners occurs. When the planes of the bottoms of the runners are perpendicular to the direction of the thrust exerted by the snow vehicle against the surface during a turn, the maximum force component of the thrust is transverse or at an angle relative to the surface rather than parallel, thus causing the runners to imbed or dig into the snow rather than slide along the surface.

The invention provides an arrangement for tilting or banking a snow vehicle during a turn, so that the planes of the bottoms of the runners are transverse or at an angle with respect to the direction of thrust of the runners against the snow covered surface. Moreover, by tilting the snow vehicle in the direction of a turn, the center of gravity of the vehicle is moved toward the center of the turning circle to provide increased stability. When the vehicle is tilted, the track 16 is banked relative to the snow covered surface and thus improves the flotation of the track 16 and reduces the tendency of the track 16 to plow or shear the snow laterally.

In accordance with the invention, means are provided for connecting the runners to the frame for changing the distance of the runners 12, 14 from the frame to tilt the frame 11 in the direction of the turn in response to actuation of a steering assembly.

In the disclosed construction such means comprises columns 24 and 26 which extend through sleeves 28 and 30 respectively, supported by a portion of the frame 11. The lower ends 32 and 34 of the columns 24 and 26 are connected to the spring saddles 33, 35 by bolts or pins 36 which extend through bushings or crossmembers 38 integral with the columns 24 and 26. The spring saddles 33, 35 are connected to leaf springs 37 which are connected to the runners 12 and 14 by brackets 39.

The means connecting the runners 12 and 14 to the frame 11 also includes means affording downward axial movement of one of the sleeves over one of the columns and upward axial movement of the other of the sleeves over the other of the columns upon rotary movement of the columns.

In the disclosed construction, such means comprises cam slots or tracks 40 and 42 in the sleeves 28 and 30. The cam slots extend both circumferentially and axially in the walls of the sleeves 28 and 30. As best shown in FIG. 3, the columns 24 and 26 are provided with cam followers which, in the disclosed construction, comprise rollers 44 rotatably supported on pegs or spindles 46 which project from the columns and into the slots 40, 42. The pegs 46 are perpendicular to the axes of the columns 24 and 26.

Although, in the disclosed construction, the pegs 46 are located on the columns 24 and 26 and the sleeves 28 and 30 are provided with cam slots, various other constructions could be employed. In the alternative, the pegs could be located on the interior of the sleeves and the cam tracks could be located on the columns.

To guide the direction of movement of the snow vehicle, a steering assembly 50 is provided which includes a steering column 51, right and left steering rods 52 and 54, and steering arms 56 and 58. The right steering rod 52 has one end connected to the arm 56 and the other end connected to a steering member 60 secured to the steering column 51. The left steering rod 54 has one end connected to the steering arm 58 and the other end connected to the steering member 60.

In operation of the invention, and referring to FIGS. 1 and 2, the cam followers 44 are shown in the centered position in the slots. Upon actuation of the steering assembly 50 to negotiate a right hand turn, movement of the steering column 51 in a clockwise direction, as shown by the arrow 61, will cause a corresponding rotation of column 24, as shown by the arrow 63, thus causing upward travel of the cam follower 44 in the slot 40 to the upper position 62 shown in broken lines. Movement of the steering column 51 in the clockwise direction also causes rotation of the column 26 in the direction shown by arrow 65, and downward travel of the cam follower 44 in the sleeve 30 to extend the runner 14 downwardly and tilt the snow vehicle to the position shown in FIG. 5 in the direction of a turn. Counterclockwise rotation of the steering column 51 will cause downward movement of the cam follower 44 in the slot 40 to the lower position 64 shown in FIG. 2, and upward movement of the cam follower in the slot 42.

I claim:

1. A snow vehicle comprising a frame, first and second runners for supporting said frame above a surface, a steering assembly, and means connecting said runners to said frame and to said steering assembly and operable e responsive to steering actuation of said steering assembly for turning of said runners about respective steering axes and for changing the vertical distance of said runners from said frame in opposite directions relative to said frame during turning of said runners about said steering axes in response to steering actuation of said steering assembly.

2. A vehicle in accordance with claim 1 wherein said means connecting said runners to said frame comprises two sleeves supported by a portion of said frame, columns extending through said sleeves, each of said columns having a lower end connected to one of said runners, and means affording downward axial movement of one of said sleeves relative to one of said columns and upward axial movement of the other of said sleeves relative to the other of said columns upon rotary movement of said columns responsive to actuation of said steering assembly.

3. A snow vehicle having a frame, two runners for supporting said frame above a surface, a steering assembly operatively connected to said runners for turning said runners about respective steering axes, and means connecting said runners to said frame and to said steering assembly and operable responsive to steering actuation of said steering assembly for turning of said runners about said steering axes and for changing the distance of said runners from said frame in opposite directions during turning of said runners about said steering axes, said means for connecting said runners to said frame comprising two sleeves supported by a portion of said frame, columns movable relative to said sleeves, each of said columns having a lower end connected to one of said runners, and means affording downward axial movement of one of said sleeves relative to one of said columns and upward axial movement of the other of said sleeves relative to the other of said columns upon rotary movement of said columns responsive to actuation of said steering assembly, said means for affording axial movement of said sleeves relative to said columns responsive to rotary movement of said columns comprising cam followers on one of said columns and said sleeves, and cam surfaces on the other of said columns and said sleeves.

4. A vehicle in accordance with claim 3 wherein said cam surfaces on each of said sleeves are aligned with respect to each other so that rotation of the columns by said steering assembly during steering movement in one direction will cause upward travel of one of said sleeves relative to one of said columns and downward travel of the other of said sleeves relative to the other of said columns to tilt the snow vehicle in the direction of the turn.

5. A vehicle in accordance with claim 3 wherein said cam followers comprise pegs extending from said columns, rollers rotatably supported on said pegs, and circumferentially and axially extending slots in said sleeves for receiving said rollers, said rollers and said slots cooperating upon rotary movement of said columns to cause axial movement of said columns relative to said sleeves.

6. A snow vehicle comprising a frame, right and left runners for supporting said frame above a surface, sleeves supported by a portion of said frame, slots in said sleeves extending circumferentially and axially of said sleeves, columns extending through said sleeves, the lower end of each of said columns being connected to one of said runners, pegs extending from said columns and into said slots, and a steering assembly supported by said frame and connected to said columns so that actuation of said steering assembly to cause turning of said snow vehicle causes cooperation of said pegs with said slots to cause upward travel of one of said sleeves relative to one of said columns and downward travel of the other of said sleeves relative to the other of said columns to tilt the snow vehicle in the direction of said turning.